Nov. 4, 1941.  A. W. HUMPHREY  2,261,254
UNIVERSAL CLUTCH SHOE ADJUSTING BOLT
Filed June 27, 1940
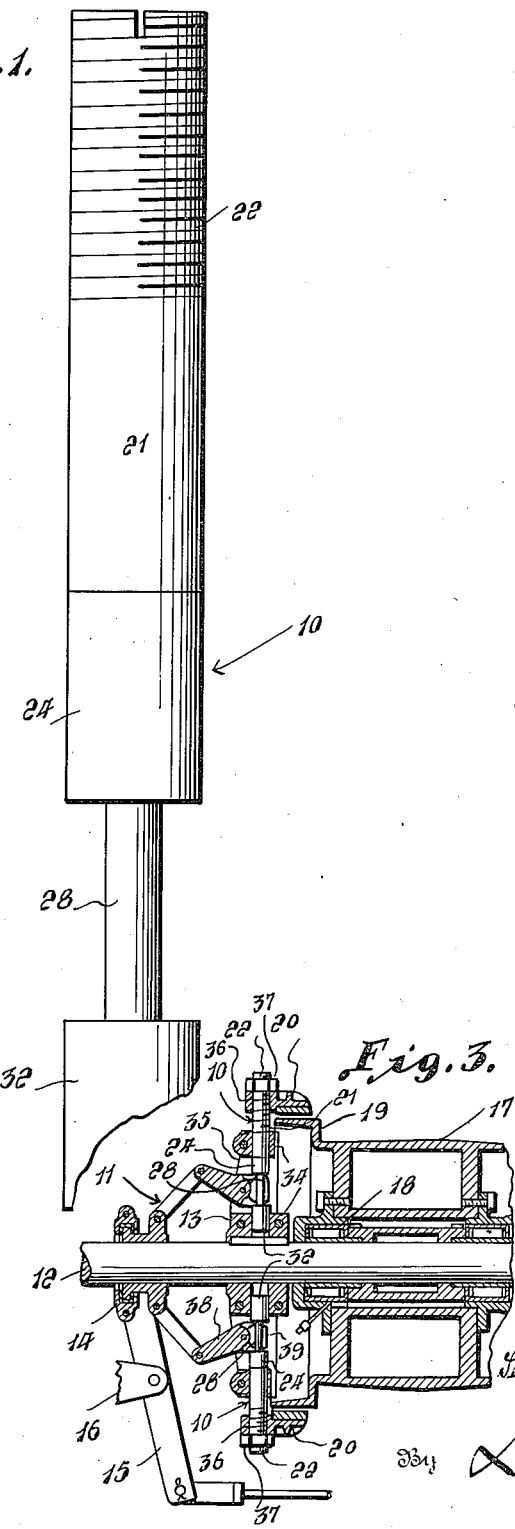
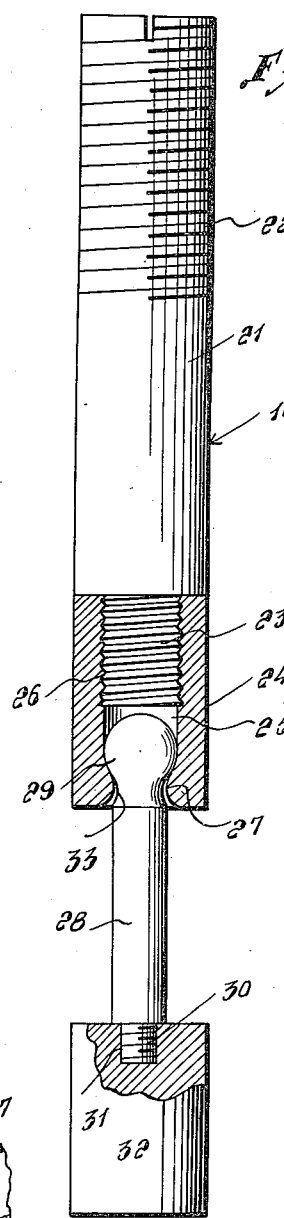
Inventor
Arnold W. Humphrey Patented Nov. 4, 1941

2,261,254

UNITED STATES PATENT OFFICE 2,261,254

UNIVERSAL CLUTCH SHOE ADJUSTING BOLT

Arnold Wayne Humphrey, Weleetka, Okla.

Application June 27, 1940, Serial No. 342,831

1 Claim. (Cl. 287—87)

This invention relates to an improved adjusting bolt for clutch shoes and more particularly to an improved construction of bolt adapted for use in adjustably connecting clutch shoes to a clutch spider of conventional pulley clutches.

More particularly, it is an aim of the invention to provide a clutch shoe adjusting bolt having rigid ends connected by a universal coupling to provide means whereby the ends may move relatively to each other to compensate for the irregular movement of a pulley relatively to a clutch so that the relative movements of such parts will not break the adjusting bolt.

In pulley clutches, the bushings of pulleys wear resulting in play between the pulley and the shaft on which it is mounted so that the pulley does not revolve in a true circle, and as a result, when a pulley is being driven by a tight belt the pulley drum will bear unevenly on the clutch shoes as it revolves causing the clutch shoes to rock relatively to the clutch spider, and causing the bolts which connect the spider and shoes to break at their weakest points.

It is therefore an aim of the invention to provide a clutch shoe adjusting bolt having means to compensate for the uneven pressure on the bolt when used with pulleys, having worn bushings, so that the eccentric rotation of the pulley and its clutch shoe drum will not damage the bolt.

Other objects and advantages of the invention will hereinafter become more fully apparent from the following description of the drawing, which illustrates a preferred embodiment thereof, and wherein:

Figure 1 is a side elevational view of the improved clutch shoe adjusting bolt,

Figure 2 is a side elevational view partly in vertical, central section of the same, and Figure 3 is a fragmentary longitudinal central sectional view, partly in elevation, showing a portion of a conventional pulley clutch and pulley with which the bolt is adapted to be used.

Referring more particularly to the drawing, wherein like reference characters designate like or corresponding parts throughout the different views, 10 designates generally the improved clutch shoe adjusting bolt which comprises the invention.

In Figure 3, a portion of a conventional pulley clutch is illustrated for the purpose of showing the use and application of the bolt 10. The pulley clutch, designated generally 11 includes a shaft 12 to which is keyed a clutch spider 13. A plurality of the bolts 10 are slidably mounted in the spider 13. The clutch 11 also includes a collar 14 which is slidably mounted on the shaft 12 and which is movable toward and away from the spider 13 by means of a rocker arm or yoke 15 which is pivotally mounted, intermediate of its ends, on a bracket 16. A pulley 17 is rotatably mounted on the shaft 12 and is provided with the bearings or bushings 18 and which form anti-friction means between the shaft 12 and pulley 17. Pulley 17, at one end thereof, is provided with a clutch drum 19 which is adapted to be frictionally engaged by the clutch shoes 20 carried by the bolts 10.

The bolt 10, as best seen in Figure 2, includes a rigid end 21 having an externally threaded outer end portion 22 and a restricted threaded shank 23, projecting from its opposite end. A socket 24 is provided with a bore 25, which extends longitudinally thereof and which is provided with an internally threaded end 26 for engaging the threaded shank 23. The opposite end 27 of the bore 25 is restricted and rounded, in cross section, as best seen in Figure 2. A stem 28 is provided with a ball 29 on one end thereof and a restricted threaded projection 30 at its opposite end which is adapted to detachably engage a threaded recess 31 in the opposite end 32 of the bolt 10. Stem 28 is provided with a grooved neck portion 33, adjacent the ball 29.

To assemble the bolt 10, the end 30 of the stem 28 is inserted into the bore 25 and moved therethrough toward the restricted end 27 to position the ball 29 within the bore 25 adjacent its restricted portion 27 which is smaller in diameter than the ball 29 so that the ball may not be passed therethrough. When thus positioned, as seen in Figure 2, the grooved neck portion 23 is loosely disposed in the rounded restricted portion 27. The socket 24 is then attached to the threaded shank 23 after which the end 32 is attached to the threaded projection 30, to complete the assembly of the bolt 10.

As seen in Figure 3, the unthreaded portion of the end 21 and the end 32 are each adapted to be slidably mounted in bores in spaced portions 34 of the spider 13, between which are provided openings 35. It is to be understood that two or more brake shoes 20 are provided and that each of the brake shoes 20 are connected to the spider 13 by a plurality of the bolts 10. Each of the brake shoes 20 is provided with a threaded bore 36 to be engaged by the threaded end 22 of each of the bolts 10 connected thereto and by means of which the brake shoes may be adjustably positioned relatively to the drum 19. A locking nut 37 engages the outer end of each of the threaded portions 22 to retain each of the bolts 10 in adjusted position relatively to its brake shoe. The collar 14 is connected to the spider 13 by means of a toggle connection 38 including portions 39 which extend into the openings 35 for engaging the stems 28 which are disposed therein.

The clutch pulley 11 operates in the conventional manner by the movement of the collar 14 in one direction for moving the bolts 10 outwardly to move the brake shoes 20 away from the drum 19, and by movement of the collar 14 in the opposite direction for moving the bolts 10 inwardly to move the brake shoes 20 inwardly and into frictional engagement with the drum 19. By providing the bolt 10 with an intermediate portion provided with a universal ball and socket joint, the ends of the bolt are flexibly mounted relatively to each other so that when the bushings 18 become worn so that the pulley 17 will not revolve in a true circle, the pressure on the brake shoes, resulting therefrom and which tends to cause the shoes to wobble or rock relatively to the spider, will not break the bolt 10. Since the stem 28 is of smaller diameter than the other portions of the bolt 10 this is the portion of the bolt which under ordinary circumstances would be broken but due to the ball and socket joint 24, 29 stem 28 can swing relatively to end 21 so that the shock on this portion of the stem is thereby taken up and the breakage of the bolt avoided. By providing the clutch 11 with bolts 10 it is possible to use worn bushings long after they would ordinarily have to be replaced thereby reducing maintenance and expense of the pulley.

Various modifications and changes are contemplated and may obviously be resorted to as only a preferred embodiment of the invention has been disclosed.

I claim as my invention:

A clutch shoe adjusting bolt comprising a bolt including a stem having a threaded end, a restricted, threaded shank projecting from the opposite end of said stem, a socket member having a recess provided with a threaded open end for engaging said threaded shank for connecting said stem and socket, the outer surface of said stem and socket being of substantially the same size and contour to provide a smooth, uninterrupted surface, said socket having a restricted rounded opening in its lower end communicating with the inner end of said recess, a pin having a ball on one end thereof disposed within said socket, said pin having a restricted neck portion disposed in said restricted opening, said pin and socket forming a universal ball and socket joint, and a head detachably connected to the opposite, shank end of said pin.

ARNOLD WAYNE HUMPHREY.